(12) United States Patent
Yao et al.

(10) Patent No.: US 9,020,254 B2
(45) Date of Patent: Apr. 28, 2015

(54) DYNAMIC IMAGE QUALITY CHECKER FOR USE IN IMAGE TRANSCODING

(75) Inventors: Yisheng Yao, Sammamish, WA (US); Ke-Cheng Huang, Sammamish, WA (US); Emmanuel Papirakis, Bellevue, WA (US); Patrick E. Plaisted, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 706 days.

(21) Appl. No.: 13/327,551

(22) Filed: Dec. 15, 2011

(65) Prior Publication Data
US 2013/0156310 A1    Jun. 20, 2013

(51) Int. Cl.
*G06K 9/36* (2006.01)
*H04N 19/154* (2014.01)
*H04N 19/40* (2014.01)
*H04N 19/192* (2014.01)

(52) U.S. Cl.
CPC ............. *H04N 19/154* (2013.01); *H04N 19/40* (2013.01); *H04N 19/192* (2013.01)

(58) Field of Classification Search
USPC ................................ 382/166, 232–251, 112; 375/240.01–240.29
See application file for complete search history.

(56) References Cited

U.S. PATENT DOCUMENTS

| | | | | |
|---|---|---|---|---|
| 6,563,517 B1 * | 5/2003 | Bhagwat et al. | ............... | 715/735 |
| 6,931,159 B2 * | 8/2005 | Ridge | ............... | 382/246 |
| 6,947,598 B2 * | 9/2005 | Yogeshwar et al. | ........... | 382/232 |
| 8,300,961 B2 * | 10/2012 | Coulombe et al. | ............ | 382/232 |
| 8,571,311 B2 * | 10/2013 | Yao et al. | ...................... | 382/166 |
| 8,612,353 B2 * | 12/2013 | Trimper et al. | .................. | 705/51 |
| 8,676,822 B2 * | 3/2014 | Davis | ............................ | 707/758 |
| 8,743,954 B1 * | 6/2014 | Masterson | ............... | 375/240.05 |
| 8,775,438 B1 * | 7/2014 | Brooker et al. | ............... | 707/748 |
| 2001/0047517 A1 * | 11/2001 | Christopoulos et al. | ........ | 725/87 |
| 2007/0053588 A1 | 3/2007 | Chen et al. | | |
| 2009/0141932 A1 | 6/2009 | Jones et al. | | |

OTHER PUBLICATIONS

National Instruments, "Peak Signal-to-Noise Ratio as an Image Quality Metric", Published on: Aug. 15, 2011, Available at: http://sine.ni.com/nipdfgenerator/nipdfgenerator?pageURL=http://zone.ni.com/devzone/cdattut/p/id/13306&clientAppName=dz&dotsPerPixel=&dotsPerPoint=, 4 pages.

Wang, et al., "Image Quality Assessment: From Error Visibility to Structural Similarity", In Proceedings of IEEE Transactions on Image Processing, vol. 13, Issue 4, Apr. 13, 2004, pp. 600-612.

Turaga, et al., "No Reference PSNR Estimation for Compressed Pictures", In Proceedings of International Conference on Image Processing, vol. 3, Dec. 10, 2002, pp. III-61-III-64.

Chono, et al., "Reduced-Reference Image Quality Assessment Using Distributed Source Coding", In Proceedings of IEEE International Conference on Multimedia and Expo, Jun. 23-Apr. 26, 2008, pp. 609-612.

Almohammad, et al., "Stego Image Quality and the Reliability of PSNR", In Proceedings of 2nd International Conference on Image Processing Theory Tools and Applications, Jul. 7-10, 2010, pp. 215-220.

Gorley, et al., "Investigating Symmetric and Asymmetric Stereoscopic Compression using the PSNR Image Quality Metric", In Proceedings of 44th Annual Conference on Information Sciences and Systems, Mar. 17-19, 2010, pp. 1-6.

* cited by examiner

*Primary Examiner* — Ishrat I Sherali
(74) *Attorney, Agent, or Firm* — Bryan Webster; Kate Drakos; Micky Minhas

(57) ABSTRACT

Described is a technology by which an image is transcoded to a desired quality measure (e.g., PSNR). A quality measure of transcoded image data is checked against a desired quality measure, and if a desired quality measure is not achieved, a different quality level is iteratively provided to attempt to re-transcode the image until the desired quality measure is achieved.

20 Claims, 4 Drawing Sheets

DYNAMIC IMAGE QUALITY CHECKER FOR USE IN IMAGE TRANSCODING

BACKGROUND

In general, there is a tradeoff between how much an image size can be compressed via transcoding and the quality of the resultant transcoded image. Many types of image files are not encoded particularly efficiently. For example, an original image file often can be significantly reduced in size without any (or very little) quality loss being noticeable to viewers. As transferring images on the Internet (or other networks) is a widespread practice, any efficiency improvement in the transcoding of image files while maintaining acceptable image quality is desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an image is transcoded to a desired quality measure (e.g., a peak signal-to-noise ratio, or PSNR value, or structural similarity (ssim) value, or the like, that falls within a quality range). A quality measure of transcoded image data is checked against a desired quality measure, and if a desired quality measure is not achieved, a different quality level is provided, one or more times, for re-transcoding the image until the desired quality measure is achieved.

In one aspect, a quality checker mechanism determines when any set of transcoded image data has a quality measure within a desired range of quality measures. When a previous quality measure did not fall within the desired range, the quality checker mechanism operates, for at least one iteration, to calculate a next quality level to obtain a different set of transcoded image data having a different quality measure. The quality checker mechanism identifies a selected set of transcoded image data having a quality measure that falls within the quality range, if one exists.

In one aspect, an image is transcoded into a transcoded image based upon an input image and a quality level input to a transcoder. If a quality measure of the transcoded image is not within a desired range and a stop condition is not reached, the quality level is changed and the input image re-transcoded based upon the new quality level. A transcoded image is returned if the quality measure of that transcoded image is within the desired range, or the input image is returned if the if the quality measure is not within the desired range.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards transcoding (and possibly re-transcoding) an image while checking the quality of each transcoded/re-transcoded image, to produce a resultant image with acceptable quality. In general, if the current transcoded images that are too low in quality, the original image can be re-transcoded with higher quality, and/or the current transcoded images that are too high in quality (and thus further compressible) can be re-transcoded with lower quality, until a transcoded image having a quality metric that falls within a desired quality range is obtained.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and image transcoding in general.

Figure 1:
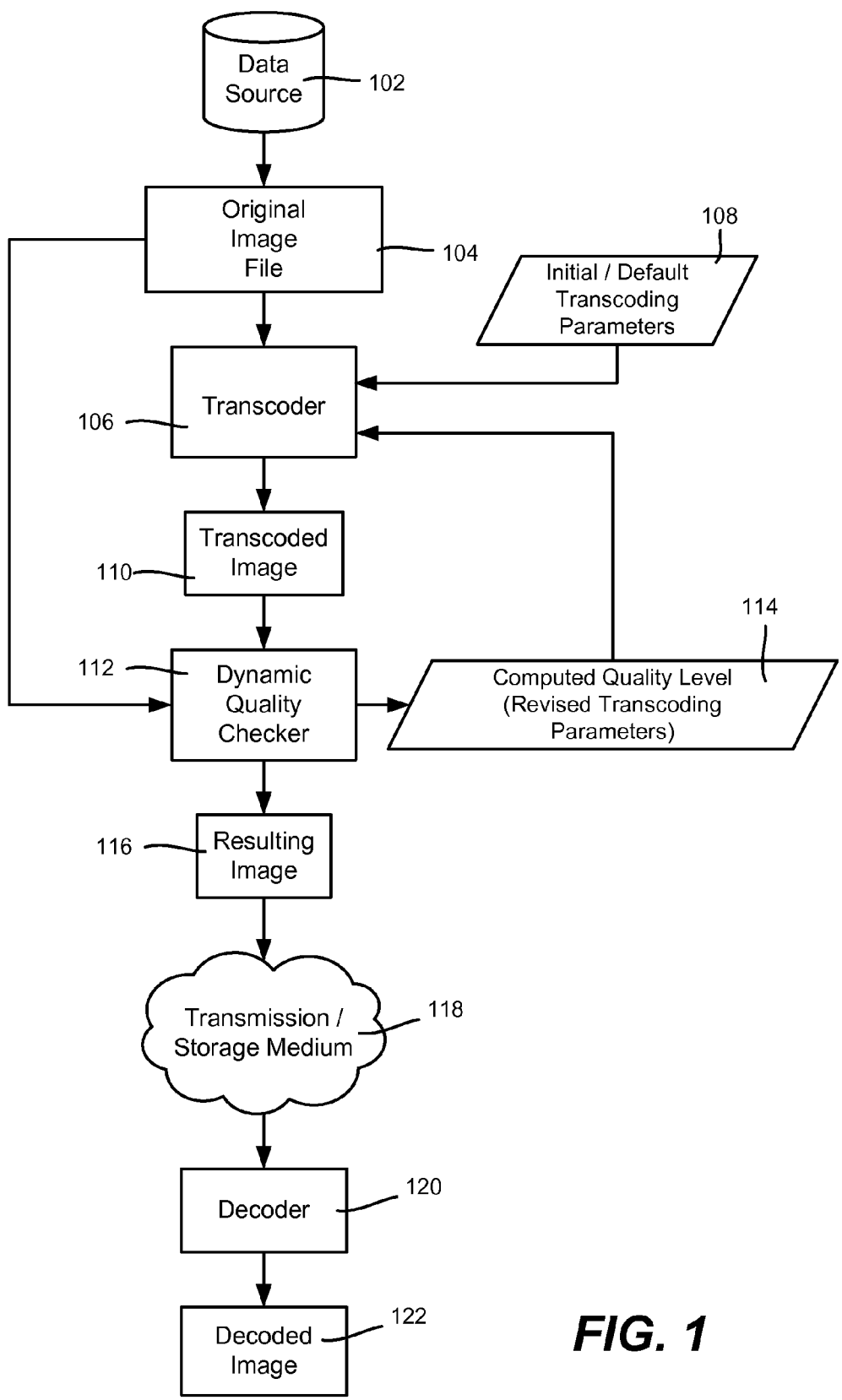
FIG. 1 is a block diagram showing example components of a system that transcode an image and checks the quality of the transcoded image according to one example implementation.

FIG. 1 shows a block diagram comprising an example system for a more optimized transcoding of image files, such as for more efficient network transferring and/or storage. In general, a data source 102 such as a website provides an original image file 104, which may be transcoded by a transcoder 106 (also referred to as a transcoder) as described herein. Note that a configurable threshold value may be set on image file size, to avoid processing where savings from the transcoding is not sufficiently significant. For example, images less than one-kilobyte in size may not be transcoded.

Images to be transcoded are processed by the transcoder 106 in virtually any way, including known ways and ways that are not yet developed. In general, the image is transcoded according to some initial or default transcoding parameters, such as size reduction, number of available colors, and so forth as appropriate for a given type of transcoded image. One example of image transcoding is described in copending U.S. patent application "Image Transcoding for Portable Network Graphics Files" (attorney docket no. 334494.01), which in general operates by tree node-based (color) reduction to transcode transparency (alpha channel) and component color data for files such as Portable Network Graphics (PNG) files.

The transcoding result is a transcoded image data 110. As described herein, a dynamic quality checker mechanism 112 checks whether the quality measure of the transcoded image data 110 is desirable, and if not, re-transcodes with a different quality level 114 (corresponding to one or more transcoding-related parameters) until the quality measure of the transcoded image data 110 is desirable (if possible). Note that the quality level may be a single transcoding-related parameter value that is understood by the transcoder, such as a value between zero and one-hundred, or may be a set of one or more parameters, e.g., a number of colors for a palette, and so forth.

In one implementation, a desirable quality measure is one that falls into an acceptable range that is not too low in quality (and is thus acceptable for viewing), and not too high in quality (and is thus sufficiently reduced in size, also referred to as compressed). If transcoding to a desirable quality measure is achieved, the dynamic quality checker mechanism 112 returns the (desirably) transcoded image data 110 as the resulting image 116. If transcoding to a desirable quality measure is not achieved (e.g., not possible or practical), the dynamic quality checker mechanism 112 returns the original image data 104 as the resulting image 116.

At this time, the resulting image 116 may be formatted into a file or other suitable structure (e.g., stream) and transmitted and/or stored over/in a suitable medium (or media) 118. When received/accessed from storage, the resulting image 116 may be viewed in a straightforward way via a decoder 120 or the like to obtain the decoded image 122 that is displayed.

Figure 2:
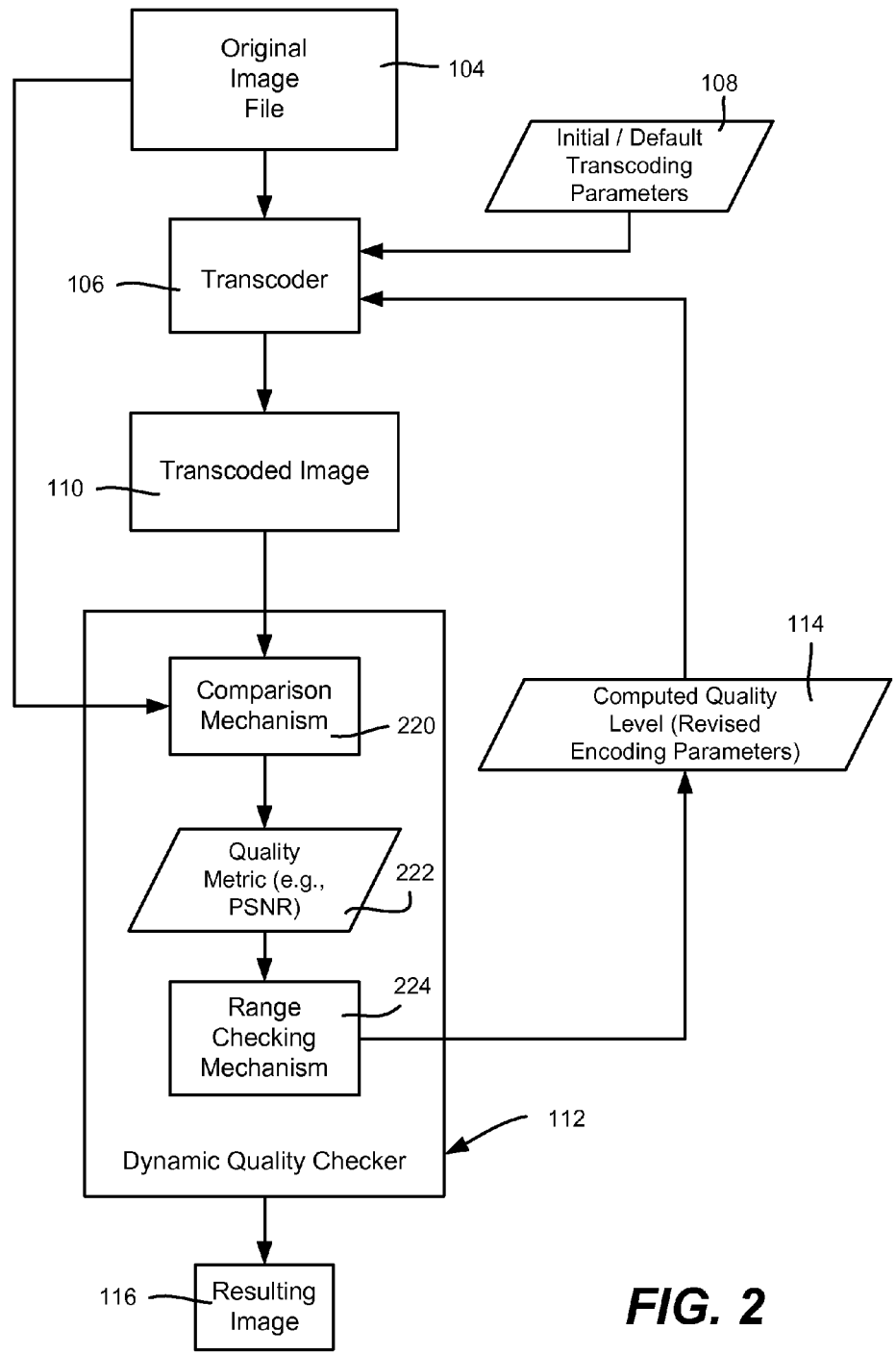
FIG. 2 is a block diagram showing a representation of a quality checker that is configured to check the image quality and provide a different quality level for re-transcoding the image when a desired quality measure (e.g., within a range) is not achieved, according to one example implementation.

FIG. 2 shows additional details of one example implementation of the dynamic image quality checker mechanism 112. As described below, a comparison mechanism 220 compares the quality of the transcoded image to output a quality metric value 222, which may be evaluated to determine how much the transcoding operation reduced the quality of the transcoded image relative to the original. A well-known quality metric that may be used for image comparison purposes is peak signal-to-noise ratio, or PSNR, in which the signal comprises the original image data, and the noise comprises the error introduced by transcoding/compression.

To evaluate the quality against a desirable range, the dynamic image quality checker 112 includes a range checking mechanism 224. The desirable range is configurable, and defaults may vary according to file type, e.g., the desirable quality range for a transcoded JPEG original file may differ from the desirable quality range for a transcoded PNG original file, or a Graphic Interchange Format (GIF) file and so on. Moreover, the range may correspond to different concepts; for example a recommended quality range for JPEG may specify a minimum quality measure of ten and a maximum quality measure of ninety (minQuality=10, maxQuality=90), where the measure is in terms of loss compression factor; the recommended quality range for PNG may specify a minimum quality measure of thirty-two and a maximum quality measure of two-hundred fifty-six (minQuality=32, maxQuality=256) where the measure is in terms of the number of colors in the palette). As used herein, the range checking mechanism 224 is configured to output a computed quality level to the transcoder, which the transcoder will use to correspondingly encode the image, with the range checking mechanism 224 increasing or decreasing the computed quality level until the measured quality falls within the acceptable range, (or the range checking mechanism 224 otherwise terminates the process).

Example configurable parameters are set forth in the table below:

| | |
|---|---|
| psnrLowCap | The lower bound of an acceptable PSNR value. Default is 20 |
| psnrHighCap | The upper bound of an acceptable PSNR value. If the current PSNR is greater than psnrHighCap, it is feasible to try to transcode the image with lower quality level(s). |
| maxRetries | The maximal number of times to retry the transcoding with different quality settings to get an acceptable PSNR value. Default is 4 |
| minQuality and maxQuality | Specifies the desired quality measure range. |

Figure 3:
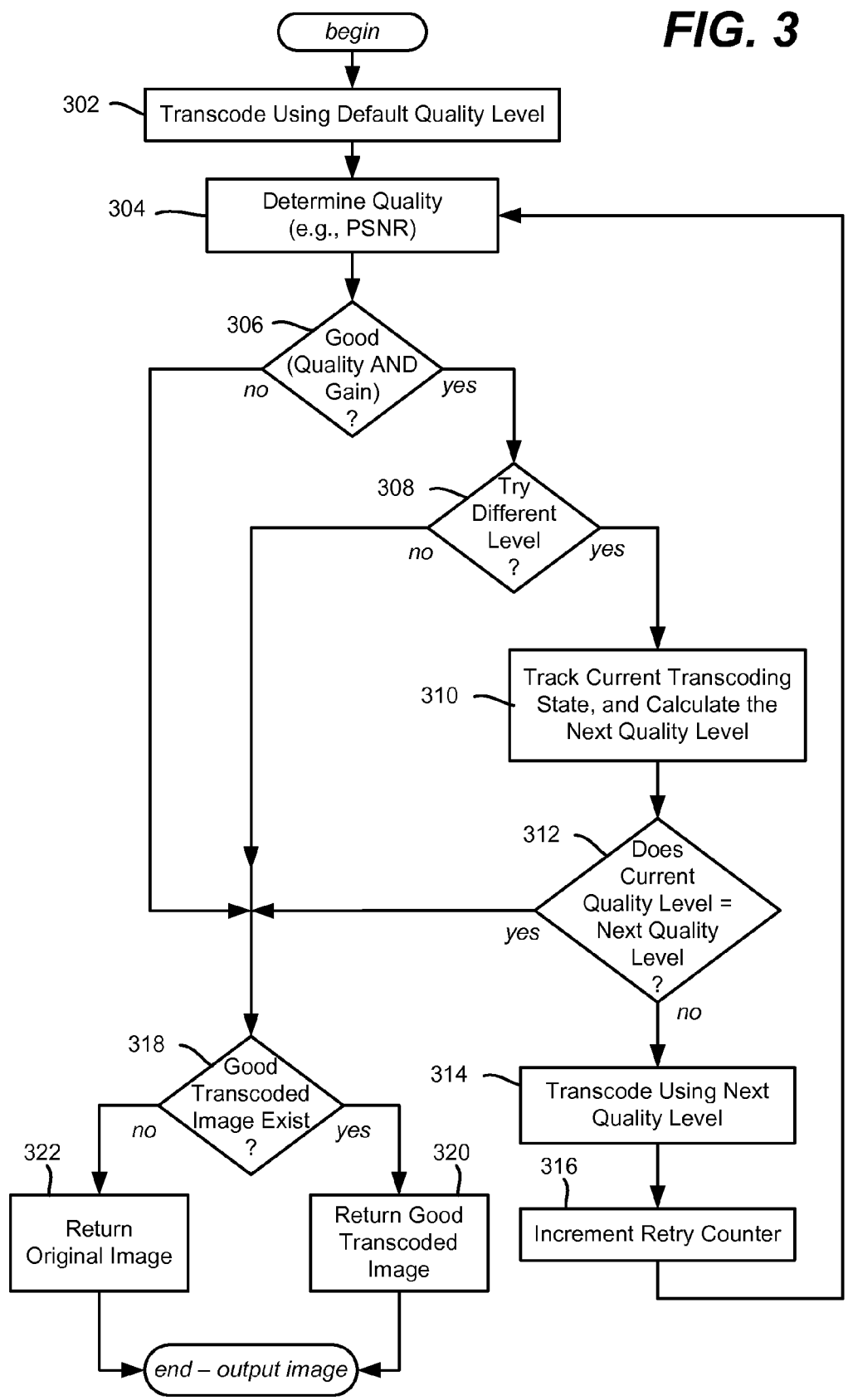
FIG. 3 is a flow diagram representing example steps that may be taken to process an image to generate a transcoded image having a desired quality level, according to one example implementation.

FIG. 3 is a flow diagram comprising steps of an example algorithm that includes operations performed by the dynamic quality checker, including the range checking mechanism. Step 302 represents transcoding using initial parameters, that is, the default quality level. Step 304 represents calculating the quality measure (e.g., PSNR in this example) of the current resulting transcoded image. Note that for images having transparency data, when calculating the PSNR, the white color is selected as the background, and the alpha value blended into the color components.

Step 306 determine if the current transcoding state is good, by evaluating whether the current PSNR is greater than or equal to the PSNR lower acceptable bound value, and that the size reduction is worthwhile, e.g., currentPsnr>=psnrLowCap && currentGain>(gainLowCap/2). Note that for low quality JPEG images (e.g., quality level around 40), the PSNR of the transcoded image data with default quality setting (40) possibly may be higher than psnrHighCap, because the transcoding did not introduce worse loss than the original one. For such scenarios, reducing the quality more will not be acceptable. To avoid this problem, the gain for the first transcoding (with default quality level) is checked; if the gain is significant enough (greater than the half of the lowGainCap, default of fifteen percent), then the original quality is much higher than the default quality level, whereby the PSNR may be calculated, and the process may continue retrying.

Step 308 determines whether transcoding with a different quality level may be attempted, by evaluating the current quality measure against the upper and lower bounds, (and also checking that the maximum number of retries has not yet been met), e.g., (currentPsnr>psnrHighCap||currentPsnr<psnrLowCap) && retryCount<maxRetries. If not within the bounds or the maximum retry count has been met, the process branches to step 318 to return an image, as described below.

If transcoding with a different quality level is to be attempted, step 310 tracks the current transcoding state, e.g., saves the current transcoded image data and the current measured PSNR for this most recent transcoding operation. The next calculated quality level (corresponding to transcoding parameters to use) for the next transcoding is established, e.g., to increase or decrease measured quality. In one implementation, the next quality level is calculated using a binary calculation with an adjusted bound, e.g., if (currentPsnr>psnrHighCap), set the next quality level to the middle of the qualityLowBound and the current quality level, where
qualityLowBound=currentQuality>defaultQuality?
defaultQuality: minQuality; or
if (currentPsnr<psnrLowCap), set the next quality level to the middle of the qualityUpperBound and the current quality level, where
qualityUpperBound=currentQuality<defaultQuality?
defaultQuality: maxQuality.

Step 312 represents ending this part of the algorithm if the current quality level is equal to the next quality level, that is, because there is no reason to retry the transcoding with the same quality level that was just used. Otherwise, step 314 represents transcoding again with the next computed quality level, which becomes the current set of data. The retry counter is also incremented at an appropriate point in the process, such as represented at step 316.

Ultimately (in normal operation) step 318 is reached via one of the aforementioned stop conditions being met, e.g., the retry count, the same calculated next quality, or the current PSNR being within the desired range (as well as any desired gain requirement being met). If a good transcoded image exists, step 320 returns this image, else the original input image is returned at step 322.

In this way, a transcoder's output can be evaluated for quality and reconfigured as needed to re-transcode an image until a desired quality measure is achieved (if possible). Note that it is straightforward to modify the checking process (e.g., of FIG. 3) such that even if a transcoded image is found to have a quality measure within the acceptable range, further size/quality reduction may be performed to possibly obtain a lesser quality image that is still within the acceptable range, thereby even further reducing the size of the transcoded image.

Example Operating Environment

Figure 4:
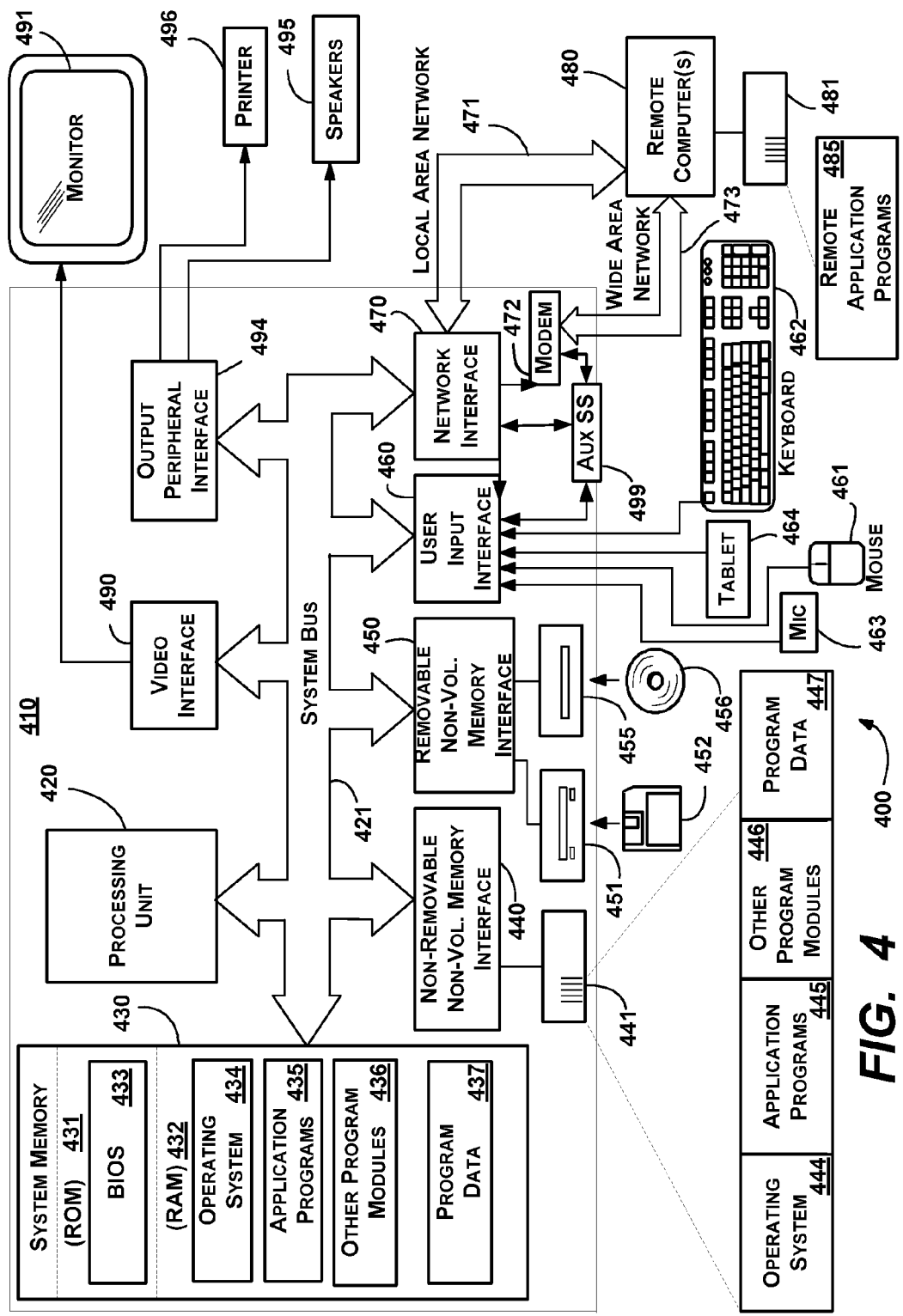
FIG. 4 is a block diagram representing an example computing environment into which aspects of the subject matter described herein may be incorporated.

FIG. 4 illustrates an example of a suitable computing and networking environment 400 into which the examples and implementations of any of FIGS. 1-3 may be implemented, for example. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the example operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an example system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are examples and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor comprising: determining whether a quality measure of transcoded image data obtained from an input image is within a desired range of quality measures, and if the desired range of quality measures is not achieved by the quality measure of the transcoded image data, providing, a different quality level one or more times for re-transcoding until the desired range of quality measures is achieved.

2. The method of claim 1 wherein checking the quality measure comprises obtaining a peak signal-to-noise ratio (PSNR) measure based upon the input image and the transcoded image data.

3. The method of claim 1 wherein the quality measure comprises a structural similarity (SSIM) value.

4. The method of claim 1 wherein re-transcoding with a different quality level comprises decreasing a previous quality level to obtain the different quality level if the quality measure of the image is too high relative to the desired range of quality measures.

5. The method of claim 4 wherein decreasing the quality level comprises using a binary calculation.

6. The method of claim 1 wherein re-transcoding with a different quality level comprises increasing a previous quality level to obtain the different quality level if the quality measure of the image is too low relative to the desired range of quality measures.

7. The method of claim 6 wherein increasing the quality level comprises using a binary calculation.

8. The method of claim 1 wherein transcoding comprises performing a color reduction operation to obtain a number of colors, and wherein re-transcoding with a different quality level comprises performing a different color reduction operation corresponding to a different number of colors.

9. The method of claim 1 wherein determining whether a quality measure of transcoded image data obtained from an input image is within a desired range of quality measures comprises evaluating loss compression factors.

10. A system comprising, a memory area storing software modules and a processor executing the software modules to implement a quality checker mechanism configured to determine when any set of transcoded image data has a quality measure within a desired range of quality measures, and for at least for one iteration to calculate a next quality level to obtain a different set of transcoded image data having a different quality measure when a previous quality measure did not fall within the desired range of quality measures, and the quality checker mechanism further configured to identify a selected set of transcoded image data having a quality measure that falls within the quality range.

11. The system of claim 10 wherein the quality measure comprises a peak signal-to-noise ratio (PSNR) value or structural similarity (SSIM) value.

12. The system of claim 10 wherein the set of transcoded image data corresponds to a transcoded JPEG file, PNG file, or GIF file.

13. The system of claim 10 wherein the quality checker mechanism calculates the next quality level by decreasing the quality level.

14. The system of claim 10 wherein the quality checker mechanism calculates the next quality level by increasing the quality level.

15. The system of claim 10 wherein the quality checker mechanism calculates the next quality level by increasing or decreasing the quality level using a binary calculation.

16. One or more computer storage media storing computer-executable instructions, which when executed perform operations, comprising:
    (a) transcoding an image into an transcoded image based upon an input image and a quality level input to a transcoder;
    (b) determining a quality measure of the transcoded image;
    (c) if the quality measure is not within a desired range and a stop condition is not reached, changing the quality level and returning to step (a); and
    (d) returning a transcoded image if the quality measure of that transcoded image is within the desired range, or returning the input image if the if the quality measure is not within the desired range.

17. The one or more computer storage media of claim 16 wherein changing the quality level comprises increasing the quality level if the quality measure is too low.

18. The one or more computer storage media of claim 16 storing further computer-executable instructions that when executed perform operations comprising, monitoring for a stop condition, including maintaining and evaluating a retry counter.

19. The one or more computer storage media of claim 16 storing further computer-executable instructions that when executed perform operations comprising, monitoring for a stop condition, including calculating a next quality level and evaluating whether the next quality level equals a previous quality level.

20. The one or more computer storage media of claim 16 storing further computer-executable instructions that when executed perform operations comprising, monitoring for a stop condition, including evaluating gain-related data.

* * * * *